United States Patent
Hamaekers et al.

(10) Patent No.: US 6,688,413 B2
(45) Date of Patent: Feb. 10, 2004

(54) BEARING SYSTEM FOR A FIRST VEHICLE PART, IN PARTICULAR DESIGNED AS A DRIVER'S CAB OF A TRUCK, ON A SECOND VEHICLE PART, IN PARTICULAR DESIGNED AS A VEHICLE FRAME

(75) Inventors: Arno Hamaekers, Gorxheimertal (DE); Arnold Simuttis, Bad Kreuznach (DE); Axel Rudolph, Seeheim/Jugenheim (DE)

(73) Assignee: Firma Carl Freudenberg, Weinheim (DE)

( * ) Notice: Subject to any disclaimer, the term of this patent is extended or adjusted under 35 U.S.C. 154(b) by 87 days.

(21) Appl. No.: 09/829,743

(22) Filed: Apr. 10, 2001

(65) Prior Publication Data

US 2001/0050192 A1 Dec. 13, 2001

(30) Foreign Application Priority Data

Apr. 11, 2000 (DE) .......................... 100 17 859

(51) Int. Cl.⁷ ............................................ B62D 33/06
(52) U.S. Cl. ................. 180/89.12; 296/190.07
(58) Field of Search .................... 180/89.14, 89.13, 180/89.12; 296/190.01, 190.04, 190.07; 267/141, 141.2, 140.13

(56) References Cited

U.S. PATENT DOCUMENTS

| | | | | |
|---|---|---|---|---|
| 4,438,970 A | * | 3/1984 | Boucher | 296/190.07 |
| 4,451,079 A | * | 5/1984 | Takahashi | 296/190.07 |
| 4,762,310 A | * | 8/1988 | Krajewski et al. | 267/141.2 |
| 4,953,833 A | * | 9/1990 | Schmidt et al. | 267/140.12 |
| 5,139,104 A | * | 8/1992 | Moscicki | 180/89.13 |
| 5,368,118 A | * | 11/1994 | Hoefle | 180/89.12 |
| 5,967,597 A | * | 10/1999 | Vander Kooi et al. | 296/190.07 |
| 5,984,036 A | * | 11/1999 | Higuchi et al. | 180/89.12 |
| 6,007,060 A | * | 12/1999 | Vermaerke | 267/140.12 |
| 6,439,651 B1 | * | 8/2002 | Johansson et al. | 296/190.07 |
| 6,474,430 B2 | * | 11/2002 | Hamaekers et al. | 180/89.14 |

FOREIGN PATENT DOCUMENTS

| | | | |
|---|---|---|---|
| DE | 7344934 | | 5/1974 |
| DE | 3117791 | * | 3/1982 |
| DE | 35 05 697 | | 8/1986 |
| DE | 4106706 | * | 9/1991 |
| EP | 0 768 231 | | 4/1997 |
| JP | 58-128972 | | 8/1983 |
| JP | 60-146755 | | 8/1985 |
| JP | 04056689 | * | 2/1992 |
| JP | 4-211761 | | 8/1992 |
| JP | 05319315 | * | 12/1993 |
| JP | 5-319315 | | 12/1993 |
| JP | 8-230721 | | 9/1996 |

* cited by examiner

Primary Examiner—Paul N. Dickson
Assistant Examiner—Deanna Draper
(74) Attorney, Agent, or Firm—Kenyon & Kenyon

(57) ABSTRACT

A bearing system for a first vehicle part, e.g., a driver's cab of a truck, on a second vehicle part, e.g., a vehicle frame, the first vehicle part being movable from a first position relative to the second vehicle part into a second position, includes a shaft about which the first vehicle part is rotatable from the first position relative to the second vehicle part into the second position, a first flexible bearing element disposed in a first shaft section of the shaft and a second flexible bearing element disposed in a second shaft section of the shaft. The first vehicle part is supported on the shaft in the first shaft section via a first supporting element and in the second shaft section via the flexible second bearing element. The shaft is supported in its first shaft section on the second vehicle part via the first flexible bearing element and in its second shaft section via a second supporting element.

19 Claims, 2 Drawing Sheets

BEARING SYSTEM FOR A FIRST VEHICLE PART, IN PARTICULAR DESIGNED AS A DRIVER'S CAB OF A TRUCK, ON A SECOND VEHICLE PART, IN PARTICULAR DESIGNED AS A VEHICLE FRAME

FIELD OF THE INVENTION

The present invention relates to a bearing system for a first vehicle part, e.g., a driver's cab of a truck, on a second vehicle part, e.g., a vehicle frame, the first vehicle part being movable from a first position relative to the second vehicle part into a second position.

BACKGROUND INFORMATION

Such a bearing system for a driver's cab of a truck on a vehicle frame is described, for example, in European Published Patent Application No. 0 768 231. The bearing system is intended to reduce the operational lateral vibrations transferred from the vehicle frame to the driver's cab and is intended to be effected in that the driver's cab is able to be decoupled from the vehicle frame in terms of lateral vibrations in relation to the vehicle's longitudinal axis. However, it is a disadvantage of this bearing system that it requires a relatively complex technical design.

SUMMARY OF THE INVENTION

It is an object of the present invention is to provide a bearing system that is easy and inexpensive to manufacture.

The above and other beneficial objects of the present invention are achieved by providing a bearing system that includes a shaft about which the first vehicle part is rotatable from the first position relative to the second vehicle part into the second position. The shaft is provided with a first flexible bearing element in a first shaft section and a second flexible bearing element in a second shaft section. The first vehicle part is supported on the shaft in the first shaft section via a first supporting element and in the second shaft section via the flexible second bearing element. The shaft is supported in its first shaft section on the second vehicle part via the first flexible bearing element and in its second shaft section via a second supporting element.

The foregoing arrangement according to the present invention provides a bearing system that is sturdy and inexpensive to manufacture and that may be arranged in the front section of the driver's cab relative to the direction of travel, so that the driver's cab may be raised or tilted about the shaft from the first position, i.e., the driving position, into the second position. The combination and arrangement according to the present invention of the supporting elements and of the flexible bearing elements, which may be designed, for example, as rubber bearings, makes it possible to reduce the transfer of vibrations to the driver's cab.

According to an aspect of the present invention, a rotary spring is provided for generating a torsional force which acts between the first and the second vehicle parts, and which supports the movement of the first vehicle part from the first position into the second position. The torsional force is measured so that the driver's cab is retained in its lower, first position due to its weight. The force required for moving the driver's cab into the second position is reduced by the rotary spring.

A particularly inexpensive construction is achieved by configuring the shaft as a rotary spring.

The shaft may be configured as a torsion spring, e.g., as a straight torsion bar.

The shaft may perform the function of a rotary spring in a particularly simple manner in that a first end of the shaft is nonrotatably joined to the first supporting element, and in that the second end of the shaft is nonrotatably joined to the second supporting element.

The nonrotatable connection may by effected by positive locking. This may be achieved by configuring the first and/or the second end of the shaft as a spline shaft.

An adjusting device which twists the shaft relative to the first and/or second vehicle part(s) for adjusting the torsional force may be provided on the first and/or second end(s) of the shaft.

The shaft may extend through the first and/or through the second bearing element(s). In this manner, a particularly compact and stable construction is attained.

Moreover, the first and/or second bearing element(s) may include a sleeve bearing having an inner anchoring part and an outer anchoring part which is joined to the inner anchoring part via an elastic spring element, the inner anchoring part being supported on the shaft, and the outer anchoring part being supported on the first or second vehicle part. In this manner, it is possible to achieve a particularly effective vibration isolation of the driver's cab.

The first and/or second bearing element(s) may be rotatably supported on the shaft via sliding bearings.

The vibration isolation of the driver's cab may be further improved in that the first and/or second bearing element(s) is/are hydraulically damping elements. This may be achieved, for example, by hydraulically damped sleeve bearings having a working chamber filled with damping fluid and a compensating chamber which is separated from the working chamber and connected thereto via a passage, the volume of the working chamber being changed during a relative movement of the first and second supporting bodies, so that damping fluid is moved into the passage between compensating chamber and working chamber.

Moreover, the first and/or second supporting element(s) may be configured rigidly.

A bearing system which is particularly stable and inexpensive to manufacture is achieved in that the first and/or second supporting element(s) has/have two legs via which the supporting element is mounted on the shaft. In this context, the supporting elements may be made of a U-profile of steel in a particularly inexpensive manner.

DETAILED DESCRIPTION

Figure 1:
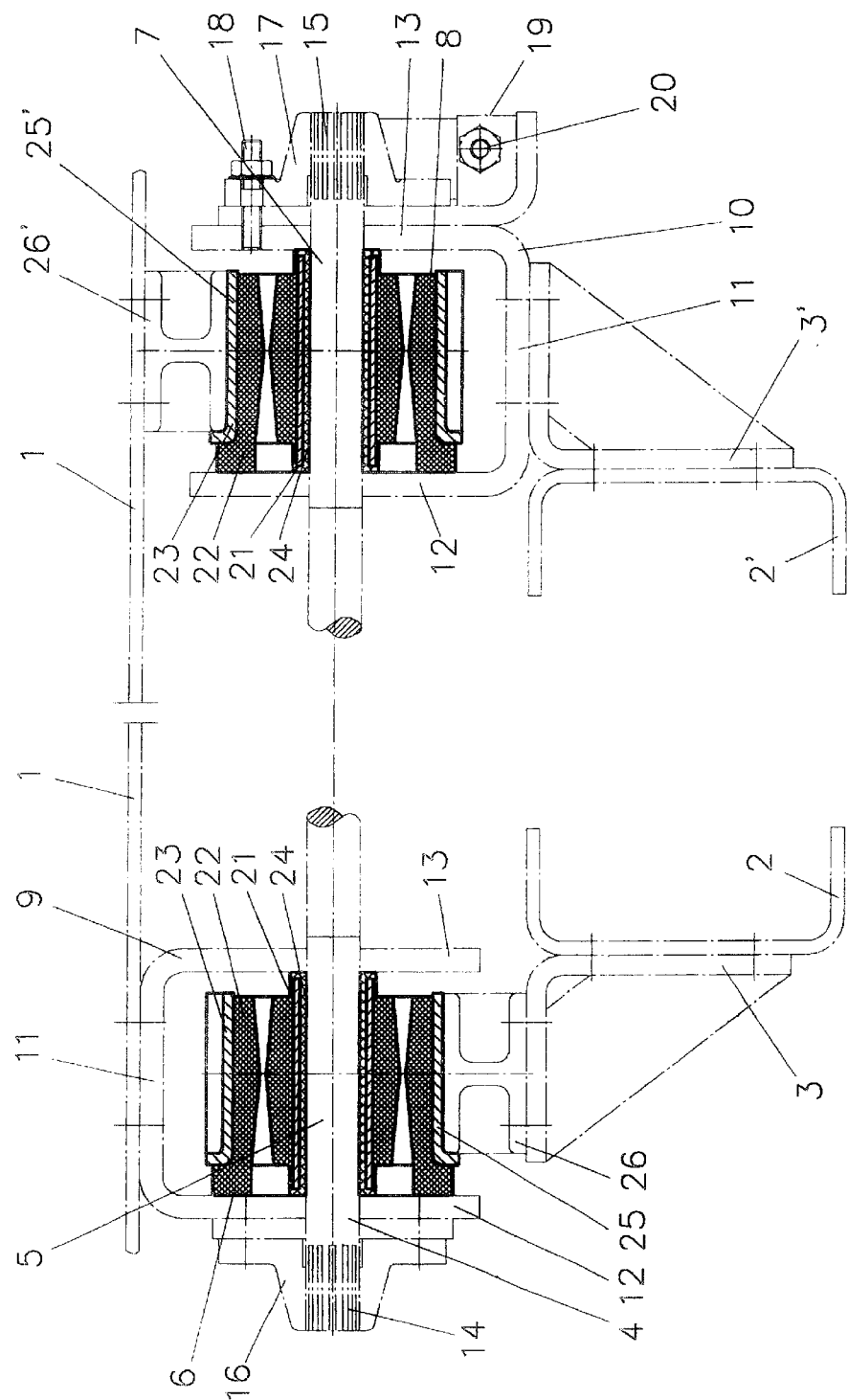
FIG. 1 is a schematic view of a first example embodiment of a bearing system for a driver's cab of a truck on a vehicle frame according the present invention.

FIG. 1 illustrates a front bearing system for a first vehicle part configured as a driver's cab 1 on a vehicle frame 2, 2'. Only a lower section of driver's cab 1 is schematically shown. Vehicle frame 2, 2' is composed of two U-shaped members extending in the direction of the vehicle's longitudinal axis, the legs of the U-shaped members of vehicle frame 2, 2' facing inwardly. On the outside of vehicle frame 2, 2', provision is made for mounting supports 3, 3'.

The bearing system according to the present invention includes a bearing unit which is arranged between mounting supports 3, 3' and driver's cab 1 and enables driver's cab 1 to be moved relative to vehicle frame 2, 2' from a first position into a second position.

The bearing system includes a shaft 4 about which driver's cab 1 is rotatable from its first position relative to vehicle frame 2, 2', for example, from the lowered driving position, into the second position, e.g., a raised servicing position. A first flexible bearing element 6 is mounted on shaft 4 in a first shaft section 5. A second flexible bearing element 8 is arranged in a second shaft section 7. Driver's cab 1 is supported on shaft 4, in first shaft section 5 via a first supporting element 9 and in second shaft section 7 via flexible second bearing element 8. Shaft 4 is supported in its first shaft section 5, on vehicle frame 2, 2' via first flexible bearing element 6 and in its second shaft section 7 via a second supporting element 10.

First and second supporting elements 9, 10 have a rigid configuration and include a U-shaped profile having a middle section 11 and two legs 12, 13. Shaft 4 extends through bore holes provided in supporting elements 9, 10 in the region of legs 12, 13, and engages with little play on contact surfaces formed by the bore holes in legs 12, 13.

Shaft 4 is configured as a rotary spring which generates a torsional force acting between driver's cab 1 and vehicle frame 2, 2'. This torsional force supports the movement of driver's cab 1 from the first position into the second position. Shaft 4 is configured and arranged as a straight torsion bar. A first end 14 of shaft 4 is nonrotatably joined to first supporting element 9. Second end 15 of shaft 4 is nonrotatably joined to second supporting element 10. The nonrotatable connection is produced by retaining elements 16 and 17, respectively, which are screwed to supporting elements 9 or 10, respectively, via fasteners 18, and which are joined positively to shaft 4. First end 14 and second end 15 of shaft 4 are configured as a spline shaft which is in force-locking engagement with correspondingly formed openings in retaining elements 16, 17.

At second end 15 of shaft 4, an adjusting device 19 is provided. The adjusting device 19 is configured to adjust the torsional force generated by shaft 4. Adjusting device 19 includes an adjusting screw 20 which makes it possible for shaft 4 to be twisted in the region of second end 15 relative to vehicle frame 2, 2' and first end 14 of shaft 4, respectively.

Shaft 4 extends through first and second bearing elements 6, 8. Both first and second bearing elements 6, 8 are sleeve bearings having an inner anchoring part 21 and an outer anchoring part 23 which is joined to the inner anchoring part 21 via an elastic spring element 22. Elastic spring element 22 is configured as a rubber member. Moreover, inner anchoring parts 21 of first and second bearing elements 6, 8 are rotatably supported on shaft 4 via sliding bearings 24. Sliding bearings 24 include axially and radially acting sliding bearing bushes which permit low-resistance twisting of shaft 4 and first and second bearing elements 6, 8, respectively.

On its lower side which faces vehicle frame 2 and mounting support 3, respectively, first bearing element 6 includes a contact surface 25 for an intermediate piece 26 via which first bearing element 6 is supported on vehicle frame 2 and mounting support 3, respectively.

A comparable contact surface 25' is formed on second bearing element 8 at its upper side facing driver's cab 1. Driver's cab 1 is elastically supported on second bearing element 8 via intermediate piece 26' which engages on contact surface 25'.

Figure 2:
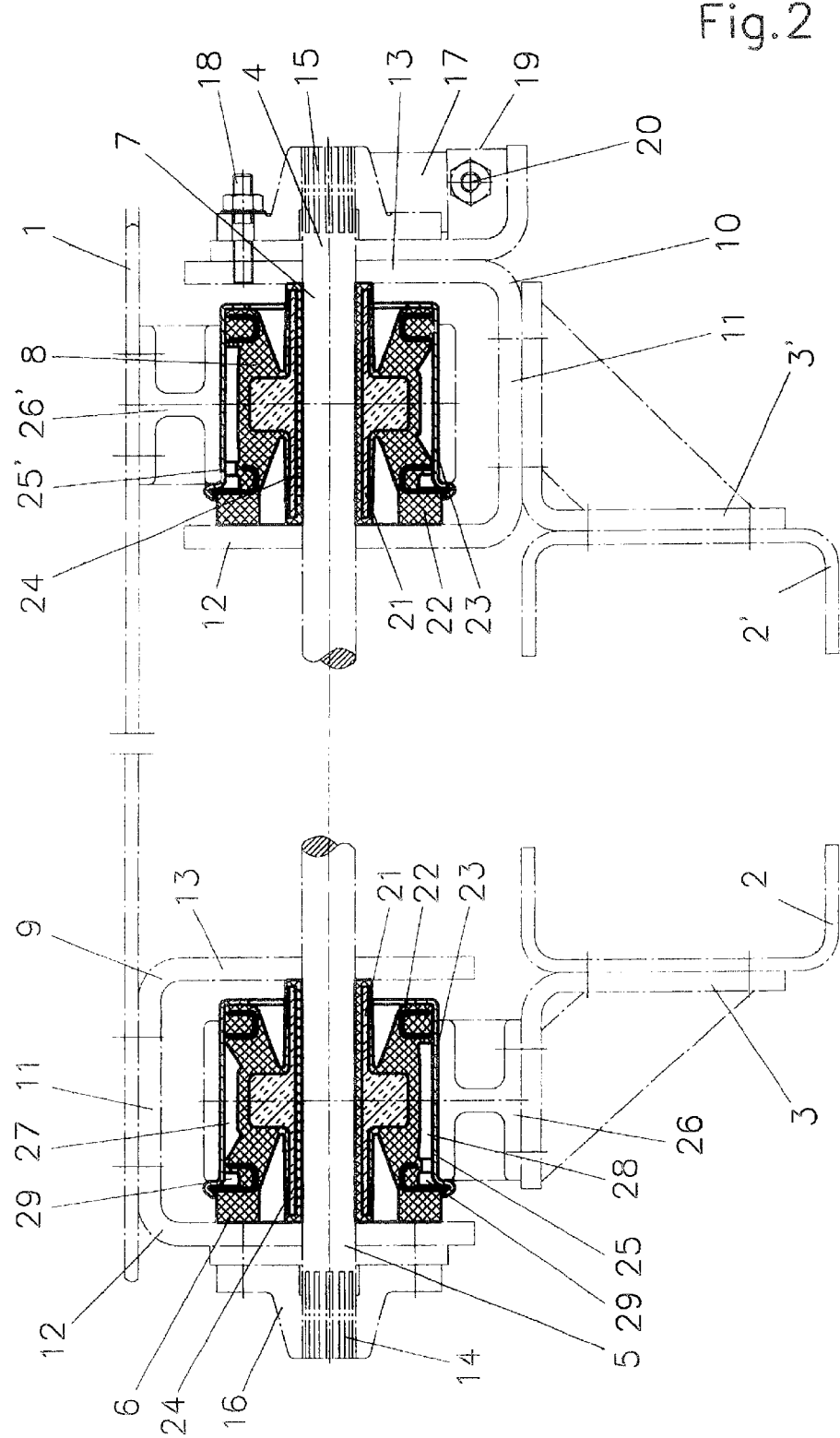
FIG. 2 is a schematic view of a second example embodiment of a bearing system for a driver's cab of a truck on a vehicle frame according to the present invention.

Another example embodiment of a bearing system according to the present invention is illustrated in FIG. 2 and substantially corresponds to the example embodiment illustrated in FIG. 1. Elements having identical functions are provided with identical reference numbers in FIGS. 1 and 2. Unlike the example embodiment illustrated in FIG. 1, first and second bearing elements 6, 8 of the example embodiment illustrated in FIG. 2 are hydraulically damping. Each of bearing elements 6, 8 includes a working chamber 27 filled with damping fluid and a compensating chamber 28 which is separated from working chamber 27 and connected to working chamber 27 via a passage 29. Passage 29 extends along the radially outer contour of first bearing element 6 and second bearing element 8, respectively.

A section 30 projecting outwardly in a radial direction is provided on inner anchoring part 21. Elastic spring element 22 is vulcanized onto this section on both sides. Projection 30 is configured as a limit stop which limits the relative movement between inner anchoring part 21 and an outer anchoring part 23.

What is claimed is:

1. A bearing system for a first vehicle part on a second vehicle part, the first vehicle part being movable from a first position relative to the second vehicle part to a second position, comprising:

a shaft, the first vehicle part being rotatable about the shaft from the first position to the second position;

a first flexible bearing element arranged on a first shaft section of the shaft, the first flexible bearing element being configured to support the shaft in the first shaft section on the second vehicle part;

a second flexible bearing element arranged on a second shaft section of the shaft, the second flexible bearing element being configured to support the first vehicle part on the shaft in the second shaft section;

a first supporting element configured to support the first vehicle part on the shaft in the first shaft section; and a second supporting element configured to support the shaft on the second vehicle part in the first shaft section.

2. The bearing system according to claim 1, wherein the first vehicle part includes a driver's cab of a truck.

3. The bearing system according to claim 2, wherein the second vehicle part includes a vehicle frame.

4. The bearing system according to claim 1, wherein the second vehicle part includes a vehicle frame.

5. The bearing system according to claim 1, further comprising a rotary spring, the rotary spring being configured to generate a torsional force acting between the first vehicle part and the second vehicle part, the rotary spring being configured to support the movement of the first vehicle part from the first position into the second position.

6. The bearing system according to claim 5, wherein the shaft defines the rotary spring.

7. The bearing system according to claim 6, wherein the shaft is configured as a torsion spring.

8. The bearing system according to claim 7, wherein the shaft is configured as a straight torsion bar.

9. The bearing system according to claim 6, wherein a first end of the shaft is non-rotatably secured to the first supporting element and a second end of the shaft is non-rotatably secured to the second supporting element.

10. The bearing system according to claim 9, wherein at least one of the first end and the second end is non-rotatably secured to the respective supporting element by positive locking.

11. The bearing system according to claim 10, wherein at least one of the first end and the second end is configured as a spline shaft.

12. The bearing system according to claim 1, wherein the shaft extends through at least one of the first flexible bearing element and the second flexible bearing element.

13. The bearing system according to claim 1, wherein at least one of the first flexible bearing element and the second flexible bearing element is configured as a sleeve bearing, the sleeve bearing including:
- an inner anchoring part supported on the shaft;
- an outer anchoring part supported on the respective one of the first vehicle part and the second vehicle part; and
- an elastic spring element, the elastic spring element joining the outer anchoring part to the inner anchoring part.

14. The bearing system according to claim 1, further comprising at least one sliding bearing rotatably supporting a respective one of the first flexible bearing element and the second flexible bearing element on the shaft.

15. The bearing system according to claim 1, wherein at least one of the first flexible bearing element and the second flexible bearing element is configured to be hydraulically damping.

16. The bearing system according to claim 1, wherein at least one of the first supporting element and the second supporting element is rigid.

17. The bearing system according to claim 1, wherein at least one of the first supporting element and the second supporting element includes two legs configured to mount the at least one of the first supporting element and the second supporting element on the shaft.

18. The bearing system according to claim 1, wherein at least one of the first bearing element is at least partially disposed within the first supporting element and the second bearing element is at least partially disposed within the second supporting element.

19. A bearing system for a first vehicle part on a second vehicle part, the first vehicle part being movable from a first position relative to the second vehicle part to a second position, comprising:
- a shaft, the first vehicle part being rotatable about the shaft from the first position to the second position;
- a first flexible bearing element arranged on a first shaft section of the shaft, the first flexible bearing element being configured to support the shaft in the first shaft section on the second vehicle part;
- a second flexible bearing element arranged on a second shaft section of the shaft, the second flexible bearing element being configured to support the first vehicle part on the shaft in the second shaft section;
- a first supporting element configured to support the first vehicle part on the shaft in the first shaft section;
- a second supporting element configured to support the shaft on the second vehicle part in the first shaft section;
- a rotary spring, the rotary spring being configured to generate a torsional force acting between the first vehicle part and the second vehicle part, the rotary spring being configured to support the movement of the first vehicle part from the first position into the second position, wherein the shaft defines the rotary spring, wherein a first end of the shaft is non-rotatably secured to the first supporting element and a second end of the shaft is non-rotatably secured to the second supporting element; and an adjusting device configured to twist the shaft relative to at least one of the first vehicle part and the second vehicle part to adjust a torsional force, the adjusting device being provided on at least one of the first end and the second end.

* * * * *

UNITED STATES PATENT AND TRADEMARK OFFICE
CERTIFICATE OF CORRECTION

PATENT NO. : 6,688,413 B2
DATED : February 10, 2004
INVENTOR(S) : Hamaekers et al.

It is certified that error appears in the above-identified patent and that said Letters Patent is hereby corrected as shown below:

Column 1,
Line 28, change "invention is to" to -- invention to --.

Signed and Sealed this

Third Day of May, 2005

JON W. DUDAS
*Director of the United States Patent and Trademark Office*